Sept. 22, 1942.        G. D. NELSON         2,296,367
VEHICLE SIGNAL
Filed Dec. 20, 1939          3 Sheets-Sheet 1
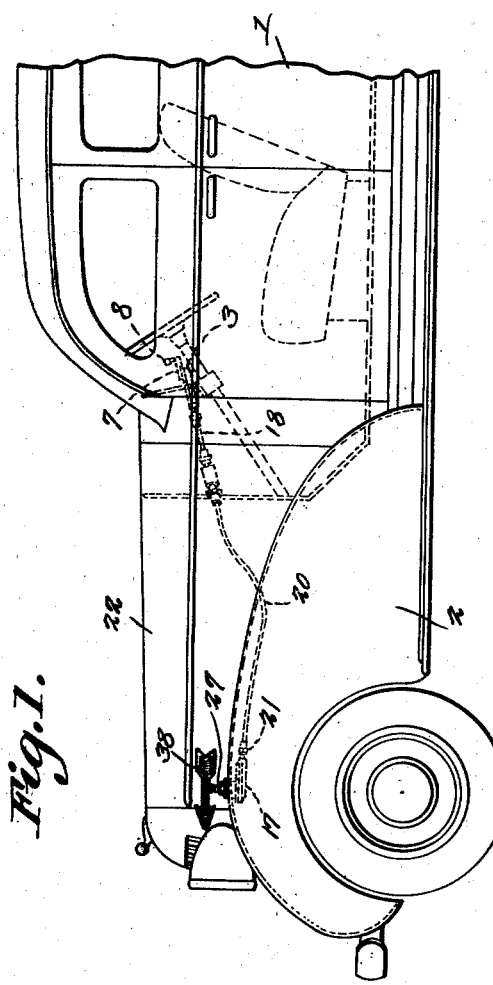
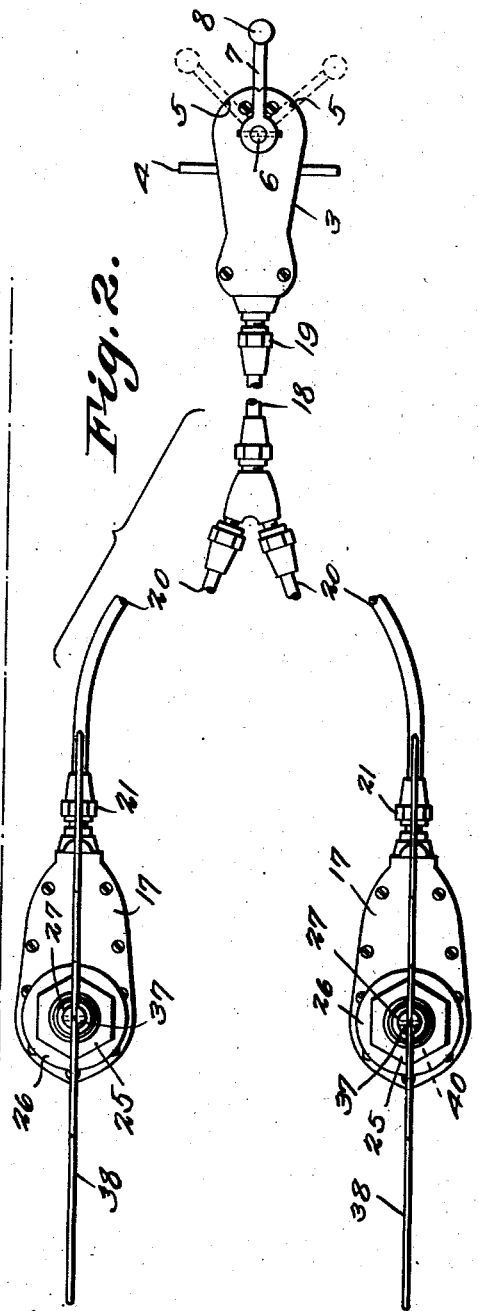
G. D. Nelson INVENTOR.
BY
ATTORNEYS.

Sept. 22, 1942.    G. D. NELSON    2,296,367
VEHICLE SIGNAL
Filed Dec. 20, 1939    3 Sheets-Sheet 2
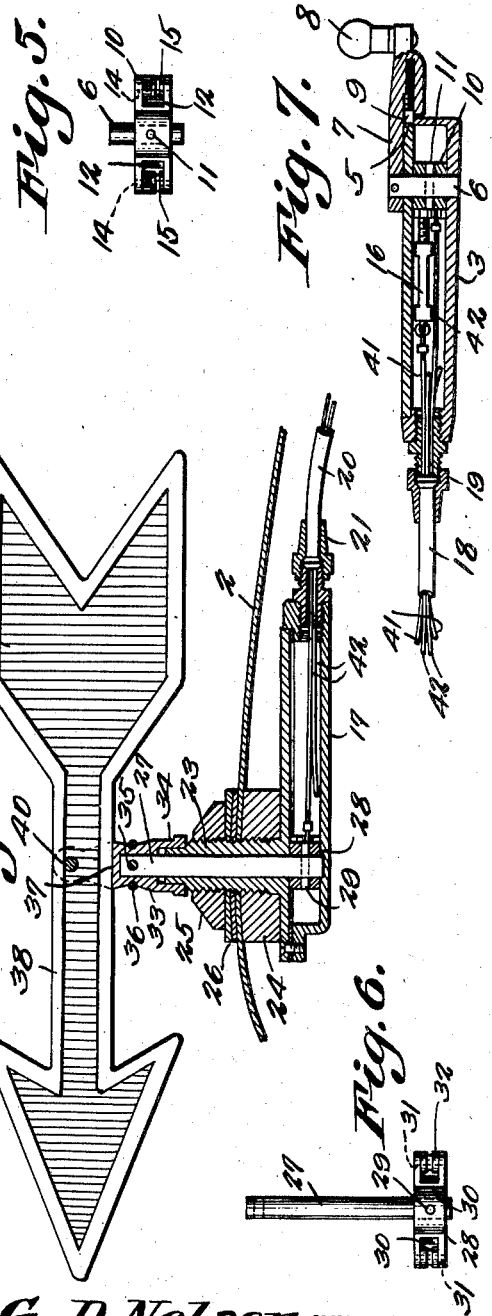
G. D. Nelson INVENTOR.
BY
ATTORNEYS.

Sept. 22, 1942.   G. D. NELSON   2,296,367
VEHICLE SIGNAL
Filed Dec. 20, 1939   3 Sheets-Sheet 3
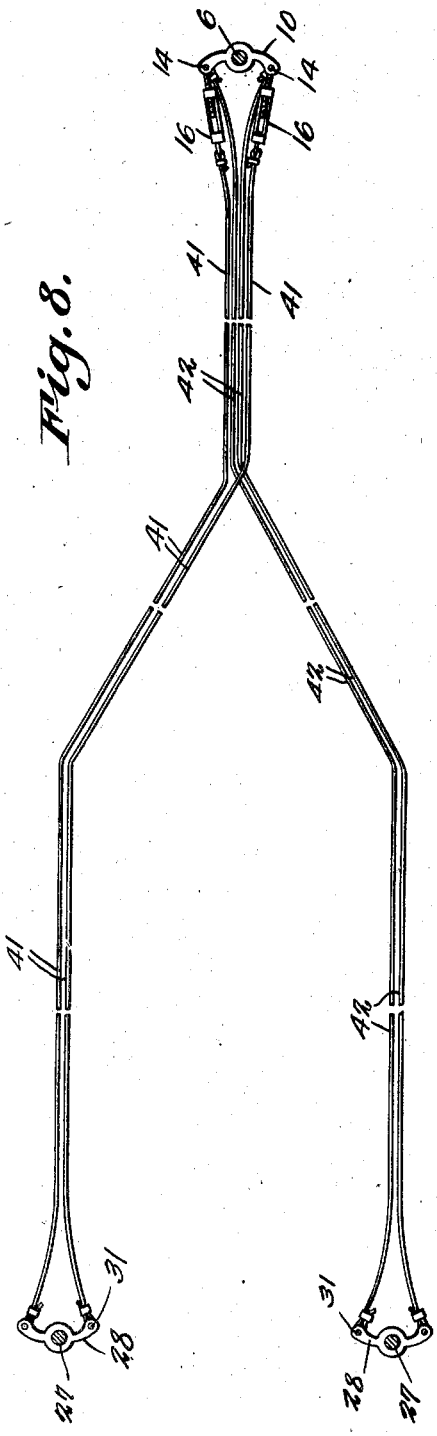
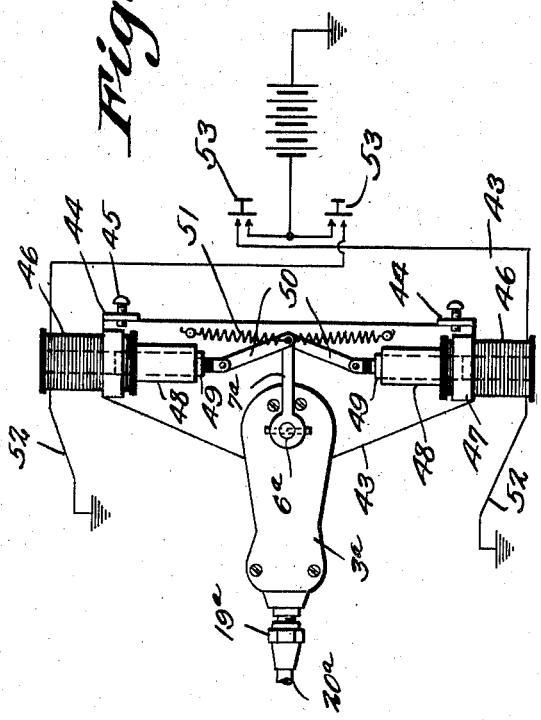
G. D. Nelson INVENTOR.
BY
ATTORNEYS.

Patented Sept. 22, 1942

2,296,367

UNITED STATES PATENT OFFICE 2,296,367

VEHICLE SIGNAL

George D. Nelson, Detroit, Mich.

Application December 20, 1939, Serial No. 310,249

1 Claim. (Cl. 74—501)

This invention aims to provide a direction signal for an automobile, of novel form, and to provide novel means under the control of an operator for actuating the signal.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in side elevation, a portion of an automobile wherewith the device forming the subject matter of this application has been assembled;

Fig. 2 is a top plan showing the device per se, parts being broken away;

Fig. 3 is a view similar to Fig. 2, but showing the parts as they will appear when the lid of the housing and the lids of the casing have been removed;

Fig. 4 is an enlarged vertical section illustrating the mounting of the indicator;

Fig. 5 is an elevation showing a cross arm that operates in the housing;

Fig. 6 is an elevation showing the shaft for the indicator;

Fig. 7 is a longitudinal section of the housing;

Fig. 8 is a diagrammatic plan illustrating the means whereby motion is transmitted to the indicators, at the will of an operator;

Fig. 9 is a plan, partly diagrammatic, illustrating one structure whereby the indicators may be operated electrically, under the control of an operator.

The numeral 1 marks a motor car having front fenders 2. There is provided a housing 3, having a flange 4 whereby the housing may be mounted on the steering post of the motor car 1. The housing 3 has keeper notches 5 on its rear end.

A vertical shaft 6 is mounted to turn in the housing 3, the shaft being actuated by a radius arm 7, extended rearwardly with respect to the housing 3 and provided with a handle 8. The radius arm 7 carries a spring pressed latch mechanism 9, adapted to engage with the keeper notches 5, but not so securely that the latch mechanism requires attention on the part of an operator.

A cross arm 10 is located in the housing 3 and is secured intermediate its ends, as shown at 11, to the shaft 6. The cross arm 10 has openings 12 in its ends. Pins 14 are mounted in the arm 10 and extend across the openings 12. Grooved pulleys 15 are mounted to turn on the pins 14, within the openings 12. The rear ends of tightening devices, such as turn buckles 16, are mounted to swing on the pins 14.

Beneath the fenders 2 are located casings 17. The rear end of a guide conduit 18 is secured by a coupling 19 to the forward end of the housing 3. The guide conduit 18 has forwardly extended, diverging branches 20, secured to the rear ends of the casings 17 by means of couplings 21. The branches 20 of the guide conduit 18 extend under the hood 22 of the car 1 and forwardly under the fenders 2.

Each casing 17 has an upwardly prolonged tubular neck 23, extended through the fender 2. A spacer 24 is threaded on the neck 23 and is interposed between the top of the casing 17 and the lower surface of the fender 2. A clamping nut 25 is threaded on the neck 23, and washers 26 are interposed between the nut and the upper surface of the fender 2, the lowermost of the washers preferably being made of felt or similar material, and the uppermost of the washers being made of metal.

In the bottom of each casing 17, and in the neck 23 thereof, a shaft 27 is mounted to rock. A cross arm 28 is located in the casing 17, and is secured intermediate its ends, as shown at 29, to the shaft 27. The cross arm 28 is supplied in its ends with openings 30, across which extend pins 31, mounted in the cross arm. Grooved pulleys 32 are mounted to turn on the pins 31, within the openings 30.

The shaft 27 projects upwardly, out of the neck 23. The upper end of the shaft 27 is mounted in a cap 33, provided with a skirt 34, receiving the smooth upper end of the neck 23. A securing element 35 extends through the cap 33 and the shaft 27, to hold those parts assembled. A resilient ring 36 is seated removably in a circumferential groove in the cap 33 and, engaging the securing element 35, prevents the securing element from slipping out of place. In its upper end, the cap 33 has a slot 37.

In the slot 37 of the cap 33 is located the intermediate portion of an indicator 38, which may be in the form of an arrow, or shaped otherwise, and ordinarily constructed of metal. Secured upon or inlaid into the indicator 38 is a correspondingly shaped panel 39, made of Retroflex glass, such glass being self-illuminating upon receipt of light from an external source, and effective to reproduce the outline of the indicator 38 after nightfall. A securing device 40, extended through the upper part of the cap 33 and through the intermediate portion of the indicator 38, holds the indicator securely in place on the cap 33.

Flexible elements 41 and 42, which may be wires, are mounted slidably in the guide conduit 18 and its branches 20. The rear ends of the flexible elements 41 are connected to the forward ends of the turn buckles 16, the forward ends of the flexible elements 41 being looped about and secured to the grooved pulleys 32 at the ends of one of the cross arms 28 on the corresponding shaft 27. The rear ends of the flexible elements 42 are looped about and secured to the grooved pulleys 15 of the cross arm 10 on the shaft 6. The forward ends of the flexible elements 42 are looped about and secured to the pulleys 32 of the other cross arm 28 on the corresponding shaft 27. Proper adjustment may be made by operating the turn buckles 16.

The operation of the device will be understood readily. By means of the handle 8 on the radius arm 7, the shaft 6 may be rotated, the cross arm 10 actuating the flexible elements 41 and 42, and those elements rotating the shafts 27, by way of the cross arms 28. The indicators 38 will be swung laterally in the same direction, and, thus, the drivers of approaching vehicles and pedestrians will be admonished as to the intentions of the driver of the vehicle whereon the device forming the subject matter of this application is mounted.

Although the device herein disclosed may be operated conveniently by the parts 7 and 8, a means is provided whereby, if desired, actuation may be produced electrically. In Fig. 9, parts hereinbefore described have been designated by numerals already used, with the suffix a.

The rear end of the housing 3a is secured to a base plate 43, provided at its rear edge with upstanding ears 44. Clamp screws 45 or similar devices, threaded into the ears 44, constitute means whereby the base plate 43 can be attached to the instrument board of a vehicle.

Oppositely disposed solenoid magnets 46 are secured at 47 to the base plate 43 and are provided at their inner ends with non-metallic guides 48, wherein the armatures 49 of the magnets 46 are mounted for right line reciprocation. The outer ends of links 50 are pivoted to the armatures 49 of the magnets 46, the inner ends of the links being pivoted to the rear end of the radius arm 7a that is secured to the shaft 6a. The inner ends of return springs 51 are secured to the rear end of the arm 7a and to the inner ends of the links 50, the outer ends of the springs being anchored on the base plate 43. In the circuits 52 of the solenoid magnets 46 are located switches 53, under the control of an operator. By closing the proper one of the switches 53, the same result will be brought about as that attained by swinging the arm 7 of Fig. 2 in opposite directions.

Having thus described the invention, what is claimed is:

Signal actuating mechanism comprising casings, means for mounting the casings below the fenders of a vehicle, a shaft mounted to rotate in each casing, a cross head housed within each casing and carried by the corresponding casing shaft, a housing, means for mounting the housing on a vehicle, a shaft mounted to rotate in the housing, a cross head carried by the housing-shaft and located within the housing, a guide tube having its rear end in communication with the housing, the tube having forward bifurcations communicating, respectively, with the casings, four flexible elements mounted to slide in the tube, to the rear of the branches, two of the flexible elements being mounted to slide in each of the bifurcations of the tube and being connected in pairs to the cross heads of the casing-shafts, all of the flexible elements being connected at their rear ends, in other pairs, to the cross head of the housing-shaft, and mechanism under the control of an operator for actuating the housing shaft.

GEORGE D. NELSON.